March 30, 1937.  L. J. BISHOP  2,075,261
TROLLEY CONVEYER
Filed May 6, 1935  2 Sheets—Sheet 1
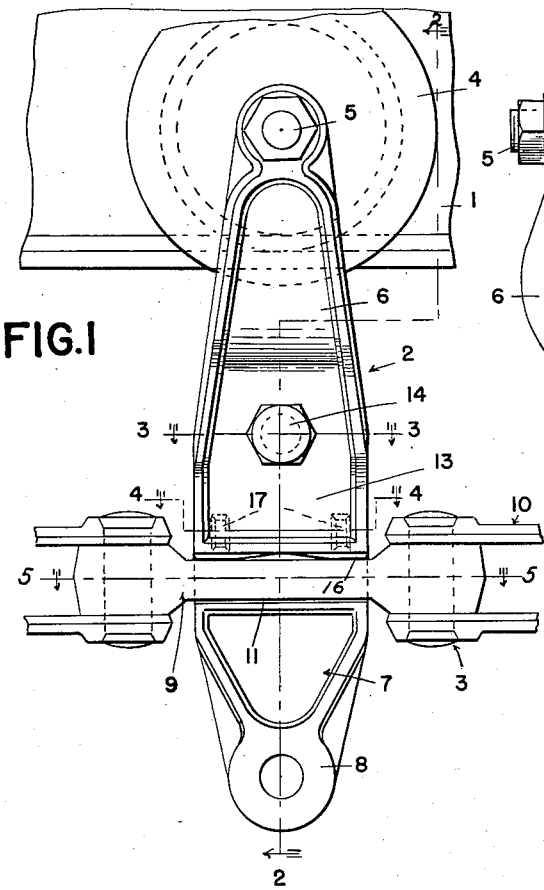
FIG.1
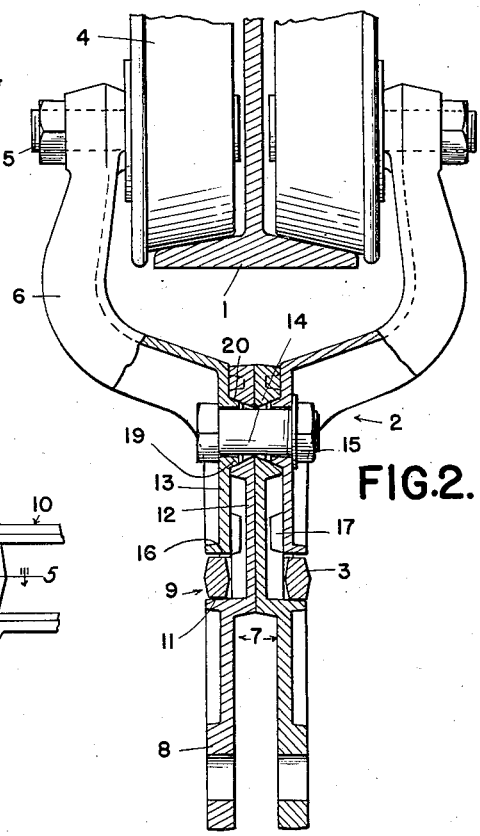
FIG.2.
FIG.3.
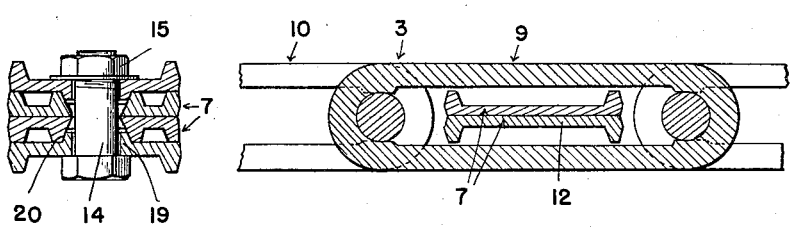
FIG.5.
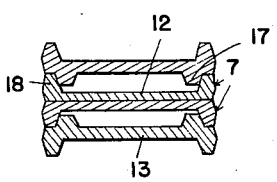
FIG.4.
INVENTOR
LEONARD J. BISHOP
ATTORNEYS March 30, 1937.  L. J. BISHOP  2,075,261
TROLLEY CONVEYER
Filed May 6, 1935  2 Sheets-Sheet 2
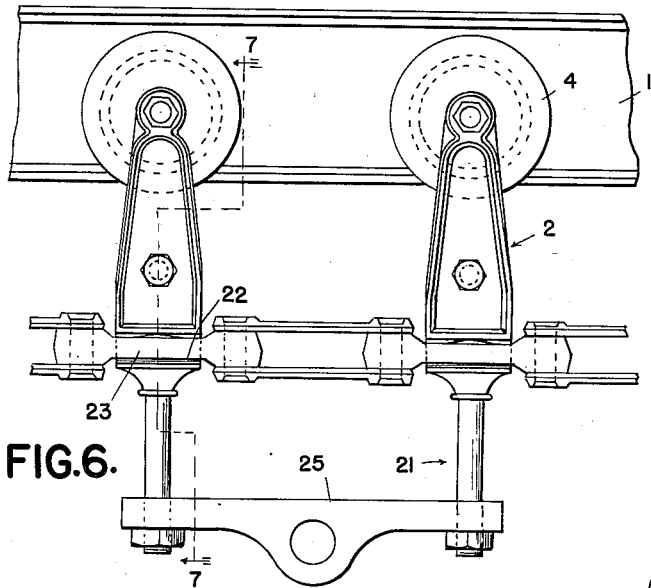
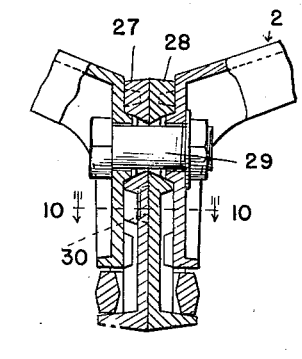
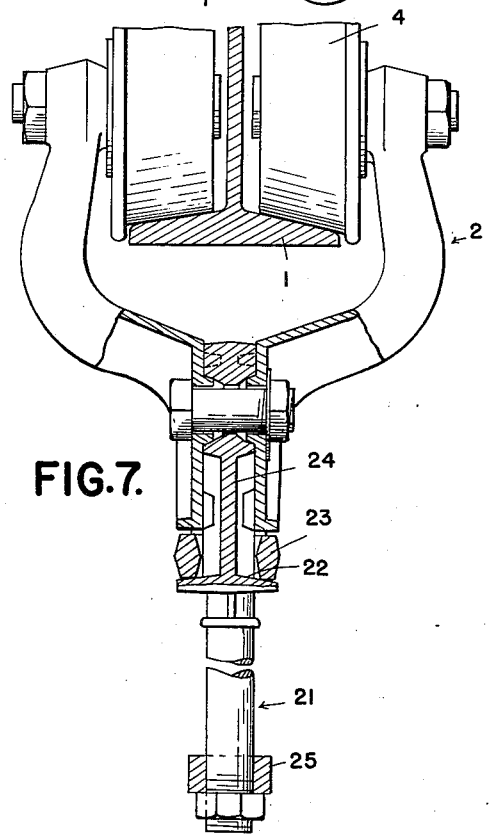
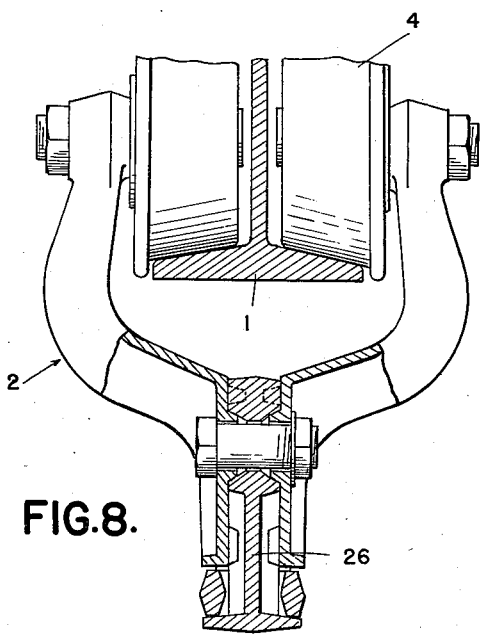
INVENTOR
LEONARD J. BISHOP
BY
ATTORNEYS Patented Mar. 30, 1937

2,075,261

UNITED STATES PATENT OFFICE 2,075,261

TROLLEY CONVEYER

Leonard J. Bishop, Detroit, Mich., assignor to Mechanical Handling Systems, Inc., Detroit, Mich., a corporation of Michigan Application May 6, 1935, Serial No. 20,101

6 Claims. (Cl. 198—177)

The invention relates to conveyers and refers more particularly to conveyers of that type having trolleys adapted to travel along an overhead track and adapted to be connected to a chain for propelling the same.

The invention has for one of its objects to provide a simple construction of trolley conveyer which can be economically manufactured. The invention has for another object to provide a construction of trolley conveyer comprising a hanger and chain attachment means so constructed that they engage a link of the propulsion chain and cooperate to secure the link from disengagement. The invention has for a further object to so construct the hanger and chain attachment means that the means for securing the elements together is substantially relieved from shear.

These and other objects of the invention will become apparent from the following description, taken in connection with the accompanying drawings, in which Fig. 1 is a side elevation of a trolley conveyer showing an embodiment of my invention;

Figs. 2, 3, 4 and 5 are cross sections on the lines 2—2, 3—3, 4—4 and 5—5 respectively of Fig. 1;

Fig. 6 is a side elevation of a trolley conveyer showing another embodiment of my invention;

Fig. 7 is a cross section on the line 7—7 of Fig. 6;

Fig. 8 is a view similar to Fig. 2 showing another embodiment of my invention;

Fig. 9 is also a view similar to Fig. 2 showing another embodiment of my invention;

Fig. 10 is a cross section on the line 10—10 of Fig 9.

As illustrated in Figs. 1 to 5 inclusive, 1 is the overhead track which in the present instance is in the nature of an I-beam, 2 are trolleys supported by and movable along the track, and 3 is the chain for propelling the trolleys. Each trolley is supported upon the track by the trolley wheels 4 which engage the opposite channels of the I-beam and travel on its lower flange. These trolley wheels are journaled upon the shafts 5 which are secured at their outer ends in the upper ends of the oppositely disposed complementary hanger members or side arms 6 forming the hanger. The means for attaching the chain 3 comprises the complementary chain attachment members 7 which are connected to and depend from the hanger members 6 and which cooperate with these hanger members to secure a link of the chain from disengagement. The chain attachment members, as shown in the present instance, have at their lower ends the integral load supporting portions 8 which are spaced apart and are in the nature of furcations having axially aligned holes therethrough adapted to engage a hook or other support for carrying the load.

The chain 3 is a conventional chain formed of the alternate links 9 and 10 pivotally connected to each other, the links 9 being one piece and formed with openings therethrough and the links 10 being formed of bars overlapping the ends of the links 9. The links 9 have the portions intermediate their ends of reduced width. The chain attachment members 7 are provided with the lateral shoulders 11 for engaging the lower face of the intermediate portion of a link 9 and are also provided with the upwardly extending portions 12 which pass through the openings in the intermediate portion and between the lower end portions 13 of the hanger members 6. The hanger members and the chain attachment members are secured together by means of the bolt 14 and the nut 15, the lower ends of the lower end portions 13 preferably engaging the upper face of the intermediate portion of the link so that this link will be held from vertical movement relative to the hanger and chain attachment members. For this purpose the lower end portions 13 are provided with the flanges 16 which may be readily ground off to an amount such that the intermediate portion of the link will fit between these flanges and the shoulders 11. The widths of the flanges 16 and the shoulders 11 are slightly less than the lengths of the intermediate portion of the link to engage between the shoulders connecting the intermediate and end portions of the link so that longitudinal movement of the link relative to the hanger and chain attachment members is limited.

For the purpose of preventing relative angular movement of the chain attachment members and the hanger members about the bolt, the lower end portions 13 of the hanger members are provided at their inner sides and near their lower ends with the integral projections 17 and the upwardly extending portions 12 of the chain attachment members are provided at their outer sides with recesses into which the projections extend. These recesses, as shown, are formed by the ribs 18 extending transversely of the upwardly extending portions at their edges. The projections 17 are spaced apart a distance to engage the ribs 18.

For the purpose of substantially relieving the securing bolt 14 from shear, interfitting projections and recesses are formed upon the overlapping portions of the hanger members and chain attachment members. As shown, the lower end portions 13 of the hanger members are formed with the projections or bosses 19 which extend inwardly around the holes through which the bolt 14 passes. The upwardly extending portions 12 of the chain attachment members are formed with the corresponding recesses 20 in their outer faces for receiving the projections.

Figs. 6 and 7 illustrate another embodiment of my invention differing essentially in the construction of the chain attachment means which comprises the single member 21 instead of complementary members. This single attachment member is provided with the lateral shoulders 22 for engaging the lower faces of the intermediate portion of the chain link 23 and is also provided with the integral upwardly extending portion 24 which passes through the intermediate portion of the chain link and is formed on both its sides with recesses constructed in the same manner as the upwardly extending portions of the chain attachment members previously described to cooperate with the projections upon the hanger members to hold the chain attachment member from angular movement relative to the hanger members and to also relieve the securing bolt from shear. This chain attachment member with an adjacent like chain attachment member is adapted to carry the load by means of the cross bar 25.

In the modification shown in Fig. 8, a single chain attachment member 26 is also used, this member being formed in substantially the same manner as the upper portion of the chain attachment member 21. In this case, the chain attachment member serves only for attachment to a chain link.

Figs. 9 and 10 illustrate another modification which differs essentially from the modification shown in Figs. 1 to 5 inclusive in the provision of cooperating means upon the chain attachment members 27 and 28 for holding the same in fixed relation to each other to thereby more positively relieve the connecting bolt 29 from shear. As shown, the upwardly extending portions of these chain attachment members are provided at their inner sides with the interfitting projections 30 and recesses 31. Each chain attachment member has a projection and a recess which are symmetrically arranged with respect to a longitudinal median plane of the attachment member so that the attachment members are complementary.

From the above description, it will be readily seen that I have provided a trolley conveyer the parts of which are so constructed that they may be readily and economically formed as by forging. It will also be seen that the parts may be readily assembled with each other and with a propulsion chain and that when assembled the chain attachment means cooperates with the trolley hanger to position and secure the chain link connected thereto. It will also be seen that the chain attachment means may be formed of one or more members and that if desired it may be provided with integral load supporting portions. It will further be seen that the corresponding parts are interchangeable.

What I claim as my invention is:

1. In a trolley conveyer, the combination with a propulsion chain, of a trolley hanger comprising, oppositely disposed hanger members, chain attachment members extending between the hanger members, a bolt extending through the hanger members and chain attachment members for securing the same together, and cooperating means upon the hanger members and chain attachment members for substantially relieving the bolt from shear, said means including annular flanges encircling the bolt and extending inwardly from the oppositely disposed hanger members into the outer ends of the aligned openings through the chain attachment members for receiving the bolt.

2. In a trolley conveyer, the combination with a propulsion chain, of a trolley hanger comprising, oppositely disposed hanger members, chain attachment members extending between the hanger members, a bolt extending through the hanger members and chain attachment members for securing the same together, cooperating means upon the hanger members and chain attachment members for substantially relieving the bolt from shear, said means including annular flanges encircling the bolt and extending inwardly from the oppositely disposed hanger members into the outer ends of the aligned openings through the chain attachment members for receiving the bolt, and cooperating means upon said hanger members and chain attachment members for holding the same from relative angular movement about said bolt.

3. In a trolley conveyer, the combination with a propulsion chain, of a trolley hanger comprising, oppositely disposed hanger members, chain attachment members extending between the hanger members and having laterally outwardly extending ribs at the side edges thereof, means for securing the hanger members and chain attachment members together, and inwardly extending projections upon the hanger members engageable with the ribs aforesaid on the attachment members to prevent relative angular movement of the latter members.

4. In a trolley conveyer, the combination with a propulsion chain, of a trolley hanger comprising, oppositely disposed hanger members, chain attachment members extending between the hanger members, a bolt extending through the hanger members and chain attachment members for securing the same together, cooperating means upon the hanger members and chain attachment members for substantially relieving the bolt from shear, said means including laterally inwardly extending annular flanges concentrically arranged on the hanger members with respect to the bolt and extending into the outer sides of the aligned openings through the attachment members for the bolt, and means for holding the attachment members from relative angular movement about the bolt including projections extending inwardly from the adjacent side edges of the hanger members and engageable with cooperating projections extending laterally outwardly from the side edges of the attachment members.

5. In a trolley conveyer, the combination with a propulsion chain, of a trolley hanger having oppositely disposed hanger members, chain attachment means extending between said hanger members, a bolt extending through said hanger members and chain attachment means for securing the same together, and annular flanges upon said hanger members extending inwardly therefrom into the outer ends of the aligned openings through said chain attachment means for receiving said bolt, 6. In a trolley conveyer, a trolley for engaging a propulsion chain, comprising a hanger having oppositely disposed hanger members, and chain attachment means extending between and secured to said hanger members, said chain attachment means having lateral shoulders engaging and supporting a link of the propulsion chain, said hanger members having flanges of a thickness materially less than the thickness of the portions of said hanger members immediately adjacent said flanges, said flanges providing lateral shoulders opposed to said first-mentioned lateral shoulders and engaging the opposite side of said link.

LEONARD J. BISHOP.